United States Patent
Wang

(10) Patent No.: US 12,497,095 B2
(45) Date of Patent: Dec. 16, 2025

(54) STEERING APPARATUS

(71) Applicant: ZF Active Safety and Electronics US LLC, Livonia, MI (US)

(72) Inventor: Jinbo Wang, Bloomfield, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 264 days.

(21) Appl. No.: 17/529,530

(22) Filed: Nov. 18, 2021

(65) Prior Publication Data

US 2023/0150570 A1    May 18, 2023

(51) Int. Cl.
| | |
|---|---|
| *B62D 5/04* | (2006.01) |
| *B60R 16/027* | (2006.01) |
| *B62D 5/00* | (2006.01) |
| *B62D 6/00* | (2006.01) |
| *B62D 6/10* | (2006.01) |
| *B62D 15/02* | (2006.01) |

(52) U.S. Cl.
CPC .......... *B62D 5/0463* (2013.01); *B60R 16/027* (2013.01); *B62D 5/006* (2013.01); *B62D 5/0466* (2013.01); *B62D 5/0472* (2013.01); *B62D 6/002* (2013.01); *B62D 6/008* (2013.01); *B62D 6/10* (2013.01); *B62D 15/0225* (2013.01)

(58) Field of Classification Search
CPC .... B62D 5/0463; B62D 5/006; B62D 5/0466; B62D 5/0472; B62D 6/002; B62D 6/008; B62D 6/10; B62D 15/0225; B60R 16/027
See application file for complete search history.

(56) References Cited

U.S. PATENT DOCUMENTS

| | | |
|---|---|---|
| 6,655,709 B2 | 12/2003 | Sherwin et al. |
| 6,789,641 B2 | 9/2004 | McLaughlin |

(Continued)

FOREIGN PATENT DOCUMENTS

| | | |
|---|---|---|
| CN | 103419835 B | 12/2013 |
| EP | 3792516 A1 | 3/2021 |

(Continued)

OTHER PUBLICATIONS

Machine Translation of WO-2004014713-A1 PDF File Name: "WO2004014713A1_Machine_Translation.pdf".*

(Continued)

*Primary Examiner* — Grant Moubry
*Assistant Examiner* — Ruben Picon-Feliciano
(74) *Attorney, Agent, or Firm* — Tarolli, Sundheim, Covell & Tummino LLP

(57) ABSTRACT

A steer-by-wire steering apparatus is for turning steerable wheels of a vehicle. The steering apparatus includes a steering wheel rotatable about a steering axis by a vehicle operator to effect turning of the steerable vehicle wheels. A first sensor is for determining a steering torque applied to the steering wheel by the vehicle operator. A power steering system is configured to turn the steerable vehicle wheels in accordance with the determined steering torque. The power steering system has a second sensor for sensing a position of a portion of the power steering system. A motor is operably connected to the steering wheel and controllable to apply a force to the steering wheel. The motor is controlled in accordance with the sensed position.

23 Claims, 2 Drawing Sheets

(56) References Cited

U.S. PATENT DOCUMENTS

| | | | |
|---|---|---|---|
| 8,066,092 B2 | 11/2011 | Shimizu et al. | |
| 10,793,183 B2 | 10/2020 | Harter, Jr. et al. | |
| 11,814,117 B2* | 11/2023 | Narasimhan | B62D 3/126 |
| 2006/0042858 A1 | 3/2006 | Boyle et al. | |
| 2017/0199102 A1* | 7/2017 | Badiru | B62D 5/0457 |
| 2017/0361867 A1 | 12/2017 | Lewis et al. | |
| 2019/0367084 A1* | 12/2019 | Hong | B62D 6/008 |
| 2020/0130739 A1* | 4/2020 | Kodera | B62D 6/008 |
| 2020/0262473 A1 | 8/2020 | Kreis et al. | |
| 2021/0371009 A1* | 12/2021 | Heinrich | B62D 6/008 |
| 2022/0258793 A1* | 8/2022 | Sun | B62D 5/0466 |
| 2022/0266901 A1* | 8/2022 | Kim | B62D 6/008 |

FOREIGN PATENT DOCUMENTS

| | | | | | |
|---|---|---|---|---|---|
| JP | 2017052448 A | * | 3/2017 | | |
| WO | WO-2004014713 A1 | * | 2/2004 | | B62D 5/04 |
| WO | WO-2020178376 A1 | * | 9/2020 | | B60W 10/08 |

OTHER PUBLICATIONS

Machine Translation of WO2020178376A1 PDF File Name: "WO2020178376A1_Machine_Translation.pdf".*
Machine Translation of JP2017052448A PDF File Name: "JP2017052448A_Machine_Translation.pdf" (Year: 2017).*

* cited by examiner

STEERING APPARATUS

FIELD OF THE INVENTION

The present invention relates to a steering apparatus for turning steerable wheels of a vehicle in response to rotation of a vehicle steering wheel.

BACKGROUND OF THE INVENTION

Power steering assemblies are common in modern vehicles. Typically, one or more rigid shafts connect a vehicle steering wheel to a steering rack of the power steering assembly. The rigid shafts must be routed from the vehicle steering wheel to the steering rack. Routing the rigid shafts between the steering wheel and the steering rack is often difficult, as other vehicle components must not interfere with the shafts.

Some known vehicle steering systems have eliminated the rigid shafts. Such systems are commonly referred to as "steer-by-wire" systems. In steer-by-wire systems, there is no mechanical connection between the steering wheel and the steering rack of the power steering assembly. Instead, an assembly associated with the steering wheel sends an electronic signal to the power steering assembly. The electronic signal actuates the power steering assembly. Since steer-by-wire systems have no mechanical connection, routing of the rigid shafts between the steering wheel and a steering rack is avoided.

Some known steer-by-wire systems include steering feel motors that utilize torque control to produce a desired steering feel for the vehicle operator. The torque control methodology is intuitive in that the motor will produce a resistance torque feel for the vehicle operator. A low resistant torque (e.g., less than 5 Nm) is typically sufficient for normal driving operations. Though, occasionally, a high resistance torque (e.g., 15 Nm or higher) may be desirable for parking and/or emergency maneuvers. Therefore, with torque control, a relatively high-power output (e.g., 15-20 Nm) motor is typically provided to produce a desired steering feel for both low-resistant and high-resistant torque events. Because the high-power output motor only provides resistance to the rotation of the steering wheel, the motor does not do positive work and, thus, the energy provided for actuating the motor is converted to heat, noise, vibration, and/or hardness in the steer-by-wire system.

SUMMARY OF THE INVENTION

According to an aspect of the invention, alone or in combination with any other aspect, a steer-by-wire steering apparatus is provided for turning steerable wheels of a vehicle. The steering apparatus comprises a steering wheel rotatable about a steering axis by a vehicle operator to effect turning of the steerable vehicle wheels. A first sensor is for determining a steering torque applied to the steering wheel by the vehicle operator. A power steering system is configured to turn the steerable vehicle wheels in accordance with the determined steering torque. The power steering system has a second sensor for sensing a position of a portion of the power steering system. A motor is operably connected to the steering wheel and controllable to apply a force to the steering wheel. The motor is controlled in accordance with the sensed position.

According to another aspect, alone or in combination with any other aspect, in a fail state, the motor can be prevented from applying the force to the steering wheel, the first sensor can sense the steering torque applied by the vehicle operator to the steering wheel, and the power steering system can turn the steerable vehicle wheels in accordance with the sensed steering torque.

According to another aspect, alone or in combination with any other aspect, a method can be provided for operating a steering apparatus of a vehicle. The method can comprise determining a steering torque applied to a steering wheel by a vehicle operator through the use of a first sensor. Steerable vehicle wheels can be turned with a power steering system in accordance with the determined steering torque. A position of a portion of the power steering system can be sensed by the second sensor. The motor can be controlled in accordance with the sensed position.

According to another aspect, alone or in combination with any other aspect, a steering apparatus can be provided for turning steerable wheels of a vehicle. The steering apparatus can comprise a steering wheel rotatable about a steering axis by a vehicle operator to effect turning of the steerable vehicle wheels. A rotatable member can be operably connected to the steering wheel and rotatable about a first axis. A first motor can be operably connected to the rotatable member and configured to rotate the rotatable member about the first axis. A first sensor is for determining a steering torque applied to the steering wheel by the vehicle operator. A power steering system can be provided for turning the steerable vehicle wheels. The power steering system can have a second motor operably connected to a steering rack and configured to linearly move the steering rack along a rack axis. An output of the second motor can be controlled in accordance with the determined steering torque. The power steering system can have a second sensor for sensing a linear position of the steering rack. The first motor can be controlled to rotate the rotatable member to a rotational position that directly corresponds to the sensed linear position of the steering rack.

According to another aspect, alone or in combination with any other aspect, a method can be provided for operating a steering apparatus. The method can comprise determining a steering torque applied to a steering wheel by a vehicle operator through the use of a first sensor. An output of the second motor can be controlled in accordance with the determined steering torque. A linear position of the steering rack can be sensed with the second sensor. The first motor can be controlled to rotate the rotatable member to a rotational position that directly corresponds to the sensed linear position of the steering rack.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
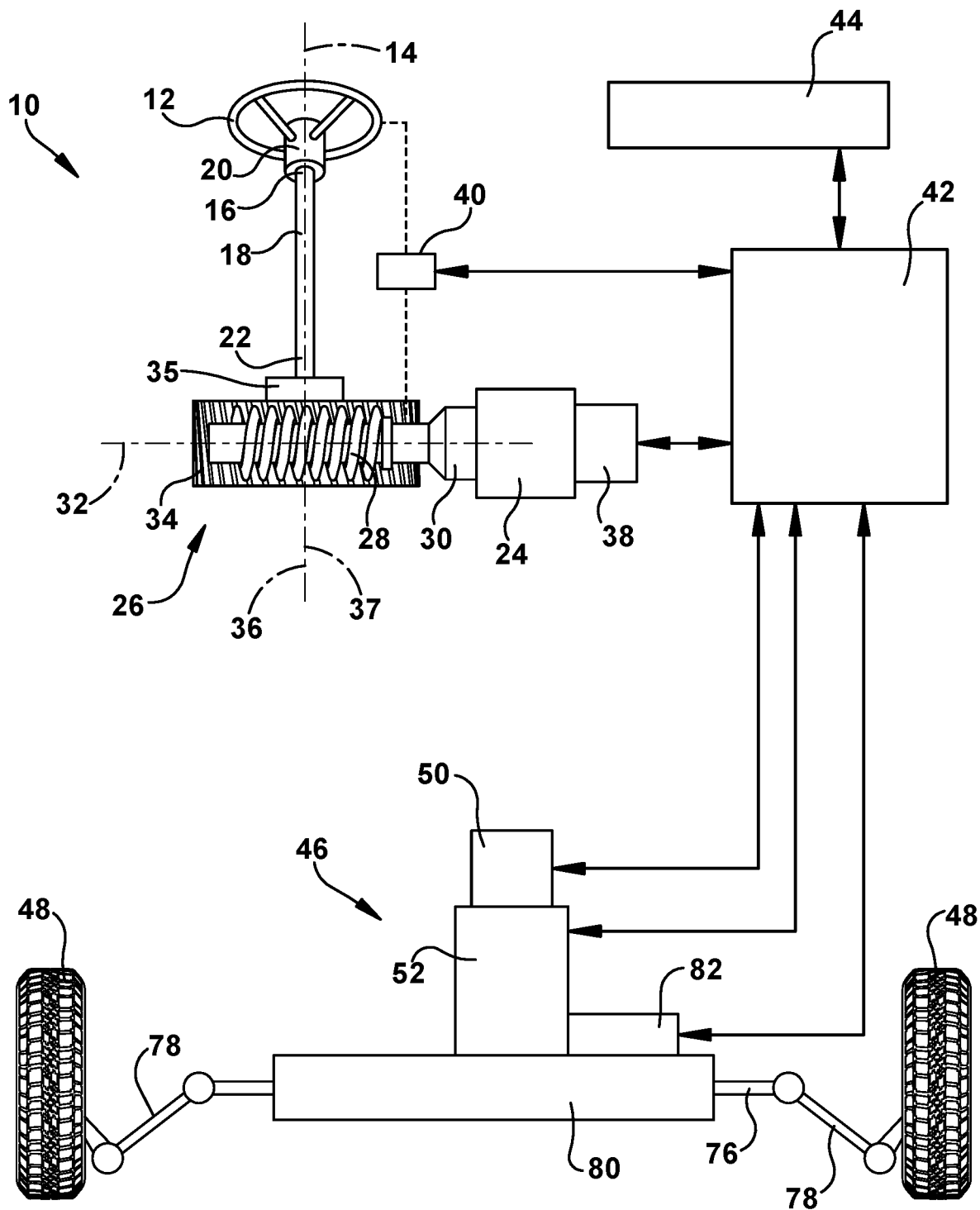
FIG. 1 is a schematic illustration of a steering apparatus for a motor vehicle.

FIG. 1 schematically illustrates a steering apparatus 10 for a motor vehicle. The steering apparatus 10 illustrated in FIG. 1 is a steer-by-wire steering apparatus. However, the teachings of the present disclosure may be adapted for use in non-steer-by-wire steering apparatus. The steering apparatus 10 includes a steering wheel 12. The steering wheel 12 is of known construction and is manually rotatable by a vehicle operator about a steering axis 14.

A first bar end 16 of a torsion bar 18 is fixed to a center or hub 20 of the steering wheel 12. The first bar end 16 may be directly fixed to the hub 20, or may be indirectly fixed to the hub by one or more intervening components. A second bar end 22 is operably connected to a first electric motor 24. Preferably, a first gear assembly 26 operably connects the first electric motor 24 to the second bar end 22.

The first gear assembly 26 includes a first gear 28 (e.g., a worm screw) that is fixed for rotation with a drive shaft 30 of the first electric motor 24. The first gear 28 may be formed separately from the drive shaft 30 and subsequently attached, or may be formed integrally with the drive shaft. The drive shaft 30 extends along a drive shaft axis 32. The first gear 28 rotates with the drive shaft 20 about the drive shaft axis 32.

The first gear assembly 26 also includes a second gear 34 (e.g., a worm wheel) that is fixed for rotation with a gear shaft 35 that extends along a gear shaft axis 37. The gear shaft 35 is fixed for rotation with the second bar end 22 and, thus, the second bar end is fixed for rotation with the second gear 34 through the gear shaft. At least one of the second gear 34, the gear shaft 35 and the second bar end 22 may be formed separately from the other of the second gear, the gear shaft and the second bar end and subsequently attached. Alternatively, at least one of the second gear 34, the gear shaft 35 and the second bar end 22 may be formed integrally from the other of the second gear, the gear shaft and the second bar end. The torsion bar 18 extends along a bar axis 36. As shown in FIG. 1, the gear shaft axis 37, the bar axis 36 and the steering axis 14 are coaxial. The second bar end 22 thus rotates with the second gear 34 about the bar axis 36. However, at least one of the gear shaft axis 37, the bar axis 36 and the steering axis 14 may be at any other desired orientation relative to at least one other of the gear shaft axis, the bar axis and the steering axis. For example, at least one of the gear shaft axis 37, the bar axis 36 and the steering axis 14 may be parallel to, perpendicular to, at an acute angle relative to, or at an obtuse angle relative to at least one other of the gear shaft axis, the bar axis and the steering axis. Therefore, the steering apparatus 10 may be configured such that the second gear 34 is rotatable about the gear shaft axis 37, the torsion bar 18 is rotatable about the bar axis 36, and the gear shaft axis and bar axis are not coaxial.

Although the second bar end 22 is shown and described as being fixed to the second gear 34 through the gear shaft 35, the first gear assembly 26 can be configured such that the gear shaft is omitted and the second bar end is fixed directly to the second gear. In such case, the second gear 34 may be formed separately from the second bar end 22 and subsequently attached, or may be formed integrally with the second bar end.

As shown in FIG. 1, the second gear 34 may meshingly engage the first gear 28. Alternatively, the first and second gears 28, 34 may be indirectly connected to one another by one or more intermediate components/gears. The first and second gears 28, 34 are shown as being a worm screw and a worm wheel, respectively. As such, the drive shaft axis 32 about which the first gear 28 rotates may be transverse (e.g., perpendicular) to the axis 36, 37 about which the second gear 34 rotates.

A steering torque applied by the vehicle operator to the steering wheel 12 urges the second gear 34 to rotate about the bar axis 36. The first gear assembly 26, however, is may be a non-reversible drive in that the first gear assembly may be driven by the first electric motor 24 only, and not by the steering torque applied to the steering wheel 12. Therefore, the second gear 34 is prevented from being rotated by the applied steering torque. Because the second gear 34 is fixed for rotation with the second bar end 22 through the gear shaft 35, the second gear prevents at least the second bar end from being rotated about the bar axis 36 by the steering wheel 12, which correspondingly provides a predetermined rotational resistance to the steering wheel.

However, by including the torsion bar 18, the steering apparatus 10 is configured so that the vehicle operator can rotate the steering wheel 12 about the steering axis 14 relative to the second gear 34. For example, the vehicle operator may be able to rotate the steering wheel 12 about 3-6° relative to the second gear 34. Therefore, the first bar end 16 may thus twist relative to the second bar end 22 in response to a predetermined applied steering torque, thereby permitting relative rotation between the steering wheel 12 and the second gear 34.

The first electric motor 24 may be controlled to control the resistance to the rotation of the steering wheel 12 and thus, is commonly referred to as a "steering feel motor." In particular, actuation of the first electric motor 24 causes the drive shaft 30 to rotate the first gear 28 about the drive shaft axis 32. The second gear 34 is rotated about the bar axis 36 by the first gear 28. Through the gear shaft 35, the rotating second gear 34 applies torque (i.e., a rotational force) to the second bar end 22 (and correspondingly, the entirety of the torsion bar 18) to provide steering feel. The torque applied by the second gear 34 may be in the same direction that the vehicle operator rotates the steering wheel 12 about the steering axis 14 and, thus, may make it easier for the vehicle operator to turn the steering wheel. In doing so, the first electric motor 24 reduces the amount of steering torque required by the vehicle operator to turn the steering wheel 12 about the steering axis 14 to a desired position.

The second gear 34 and second bar end 22 may thus be rotated by the first electric motor 24 in the same direction as the steering wheel 12 and first bar end 16 about the steering axis 14. However, the steering wheel 12 and first bar end 16 may be rotated ahead of the second bar end 22 and second gear 34 based on the amount of steering torque that the vehicle operator applies to the steering wheel.

The first electric motor 24 may be of any known type suitable for use in the steering apparatus 10. For example, the first electric motor 24 may be a variable reluctance motor, a permanent magnet alternating current motor or a brushless direct current motor.

A first electronic control unit ("ECU") 38 is operably connected to the first electric motor 24. The first ECU 38 actuates and controls the first electric motor 24 to control the steering resistance (i.e., the resistance to the rotation of the steering wheel 12) provided to the steering wheel. The first ECU 24 is preferably a microcomputer. Alternatively, the first ECU 24 may be formed from discrete circuitry, an application-specific-integrated-circuit ("ASIC"), or any other type of control circuitry.

The steering apparatus 10 may include at least one torque/position sensor 40 that is operatively connected to the steering wheel 12 (or a component that is fixed for rotation with the steering wheel, such as, for example, the first bar end 16 or the hub 20) and the second gear 34 (or a component that is fixed for rotation with the second gear, such as, for example, the gear shaft 35). The torque/position sensor 40 is operable to sense the rotational position (i.e., rotational angle) of the second gear 34, and a relative rotational position (i.e., rotational angle) between the steering wheel 12 and the second gear. The torque/position sensor 40 may be any known sensor or group of sensors for sensing the rotational position of the second gear 34 and the relative rotational position between the steering wheel 12 and the second gear 34, and for generating signals indicative of the sensed parameters. The torque/position sensor 40 may include, for example, an optical, a magnetic and/or a mechanical sensor of known construction.

The torque/position sensor 40 may be configured to internally determine a steering torque applied to the steering wheel 12 by the vehicle operator as a function of a spring constant of the torsion bar 18 and the relative angle between the steering wheel 12 and second gear 34. In such case, the signals generated by the torque/position sensor 40 would include the vehicle operator applied steering torque.

A second ECU 42 is operatively coupled to the torque/position sensor 40 and to the first ECU 38. The second ECU 42 receives the signals indicative of the rotational position of the second gear 34 from the torque/position sensor 40 and the relative rotational position between the steering wheel 12 and the second gear 34. The second ECU 42 may also receive the signals from the torque/position sensor 40 indicative of the vehicle operator applied steering torque when determined by the torque/position sensor 40. Alternatively, the second ECU 42 may receive signals indicative of the relative angle between the steering wheel 12 and second gear 34 and internally determine the applied steering torque as a function of those received signals and the spring constant of the torsion bar 18. In response to the signals from the torque/position sensor 40, the second ECU 42 generates and transmits a first signal corresponding to the sensed vehicle operator applied steering torque. The second ECU 42 may also be operatively connected to and communicate with a vehicle CAN bus 44. The second ECU 42 may request and/or receive certain vehicle operating characteristics, such as vehicle speed, from the vehicle CAN bus 44. The second ECU 42 is preferably a microcomputer. Alternatively, the second ECU 42 may be formed from discrete circuitry, an application-specific-integrated-circuit ("ASIC"), or any other type of control circuitry.

The steering apparatus 10 also includes a power steering system 46 configured to turn steerable vehicle wheels 48. In the example configuration of FIGS. 1-2, the power steering system 46 is an electric power steering system. However, the steering apparatus 10 can be configured to include other types of power steering systems besides electric (e.g., hydraulic).

The power steering system 46 includes a third ECU 50. The third ECU 50 receives the first signal from the second ECU 42. The third ECU 50 is further operatively coupled to a second electric motor 52. The third ECU 50 controls the operation of the second electric motor 52 in accordance with the first signal. For example, the third ECU 50 may run an algorithm that uses the vehicle operator applied steering torque from the first signal a parameter for controlling the operation of the second electric motor 52. The third ECU 50 is preferably a microcomputer. Alternatively, the third ECU 50 may be formed from discrete circuitry, an application-specific-integrated-circuit ("ASIC"), or any other type of control circuitry. Although the power steering system 46 is shown and described as having a single electric motor 52 controlled by a single ECU 50, the power steering system may have any number of electric motors and ECUs for turning the steerable vehicle wheels 48.

The second electric motor 52 may be of any known type suitable for use in the steering apparatus 10. For example, the second electric motor 52 may be a variable reluctance motor, a permanent magnet alternating current motor or a brushless direct current motor.

Figure 2:
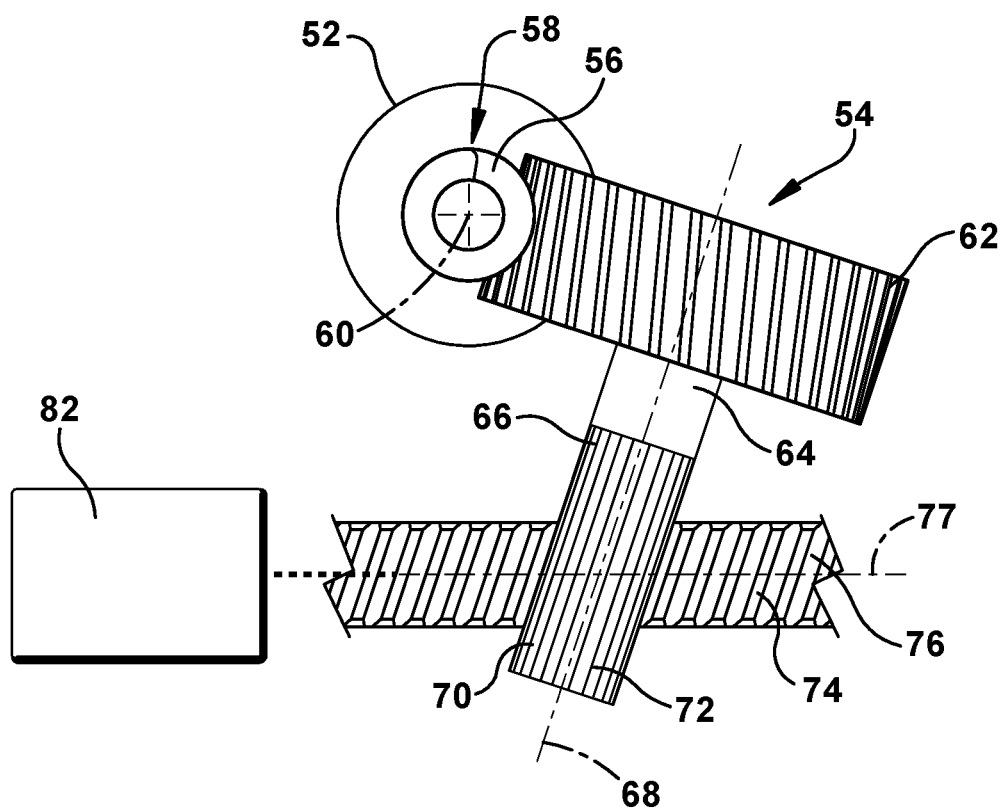
FIG. 2 is a schematic illustration of a portion of an example power steering system of the steering apparatus of FIG. 1.

The second electric motor 52 effects turning of the steerable vehicle wheels 48 through a second gear assembly 54. FIG. 2 schematically depicts an example second gear assembly 54 that is operably connected to the second electric motor 52. The second gear assembly 54 of FIG. 2 includes a worm screw 56 that is fixed for rotation with a drive shaft 58 of the second electric motor 52. The worm screw 56 may be formed separately from the drive shaft 58 and subsequently attached, or may be formed integrally with the drive shaft. The drive shaft 58 extends along a drive shaft axis 60. The worm screw 56 rotates with the drive shaft 58 about the drive shaft axis 60.

A worm wheel 62 meshingly engages and is rotatable by the worm screw 56. The worm wheel 62 is fixed for rotation with a first pinion end 64 of a pinion 66. The worm wheel 62 may be formed separately from the first pinion end 64 and subsequently attached, or may be formed integrally with the first pinion end. The pinion 66 extends along a pinion axis 68. The first pinion end 64 rotates with the worm wheel 62 about the pinion axis 68.

A second pinion end 70 has a gear portion 72 that is meshingly engaged to a gear portion 74 of a steering rack 76. Rotation of the pinion 66 about the pinion axis 68 causes the steering rack 76 to move linearly along a rack axis 77 relative to the vehicle. As shown in FIG. 1, each end of the steering rack 76 is connected to an associated steerable wheel by a tie rod 78. Therefore, the linear movement of the steering rack 76 acts on the steerable vehicle wheels 48 through the tie rods 78 to turn the steerable vehicle wheels. The steering rack 76 may be supported by a housing 80 and may linearly move relative to the housing. At least one of the components of the second gear assembly 54 may be supported in the housing 80.

The second electric motor 52 thus effects the turning of the steerable vehicle wheels 48 in accordance with to the first signal through the second gear assembly 54. The number and type of components in the second gear assembly 54 described and shown in the present disclosure is merely just one example gear assembly used to operably connect the second electric motor 52 to the steering rack 76. The second gear assembly 54 may include any number and type of components necessary for operably connecting the second electric motor 52 to the steering rack 76.

As shown in FIGS. 1-2, the power steering system 46 may include at least one position sensor 82 for sensing a linear position of the steering rack 76 along the rack axis 77. The position sensor 82 may be any known sensor or group of sensors for sensing a linear position of the steering rack 76 along the rack axis 77 and for generating signals indicative of the sensed linear position of the steering rack. The position sensor 82 may include, for example, an optical, a magnetic and/or a mechanical sensor of known construction. As shown in FIG. 1, the position sensor 82 is operatively connected to the second ECU 42. The second ECU 42 receives the signals indicative of the linear position of the steering rack 76 from the position sensor 82.

In the illustrated embodiment, the torque/position sensor 40 is electrically connected to the third ECU 50 by the second ECU 42. The second ECU 42 generates and transfers the first signal to the third ECU 50. The third ECU 50 controls a torque output of the second electric motor 52 in accordance with the vehicle operator applied steering torque provided in the first signal. For example, the third ECU 50 may control the amount of torque outputted by the second electric motor 52 and the direction of the outputted torque. The second electric motor 52 thus is torque controlled (i.e., controlled as a function of the vehicle operator applied steering torque).

The second ECU 42 receives the signals indicative of the linear position of the steering rack 76 from the position sensor 82. Using the linear position of the steering rack 76, the second ECU 42 determines a rotational position of the second gear 34 that directly corresponds to the linear position steering rack 76. The determination may be made by running algorithms that transform the received linear position of the steering rack 76 into a corresponding rotational position of the second gear 34. Alternatively, the determination may be made by accessing stored reference data that includes predetermined linear positions of the steering rack 76 and predetermined rotational positions of the second gear 34 that directly correlate to the predetermined linear positions of the steering rack.

The second ECU 42 then compares a current rotational position of the second gear 34 (i.e., the rotational position of the second gear 34 that was sensed by the torque/position sensor 40 and received by the second ECU) with the determined rotational position of the second gear 34 that directly corresponds to the linear position steering rack 76. The second ECU 42 generates and transmits a second signal corresponding to the difference between the current rotational position of the second gear 34 and the determined rotational position of the second gear 34 that directly corresponds to the linear position steering rack 76. The second signal is transmitted to the first ECU 38.

The first ECU 38 receives the second signal. In response to the second signal, the first ECU 38 controls the first electric motor 24 to rotate the second gear 34 as a function of the difference between the second gear's current position and the determined rotational position of the second gear that directly corresponds to the linear position steering rack 76 so that the second gear may be rotated to the rotational position that directly corresponds to the linear position steering rack. Therefore, the first electric motor 24 is position control (i.e., controlled as a function of the linear position of the steering rack 76).

The sensors 40, 82, the first electric motor 24 and the first and second ECUs 38, 42 may thus function as a closed loop position control for the second gear 34 in that the position sensor measures the linear position of the steering rack 76, the second ECU receives a signal from the position sensor, the second ECU transmits the second signal to the first ECU, the first ECU controls the first electric motor to rotate the second gear from a first rotational position measured by the torque/position sensor to the rotational position that directly corresponds to the linear position steering rack. The first electric motor 24 may be controlled to rotate the second gear 34 until the torque/position sensor 40 senses that the second gear is in the rotational position that directly corresponds to the linear position steering rack 76.

The second gear 34 rotating to the rotational position that directly corresponds to the linear position steering rack 76 applies torque to the second bar end 22 (and correspondingly, to the steering wheel 12 through the torsion bar 18). The second gear 34 may be rotated in the same direction that the vehicle operator rotates the steering wheel 12 about the steering axis 14 and, thus, may reduce the amount of steering torque required by the vehicle operator to turn the steering wheel about the steering axis to a desired position. The first electric motor 24, by rotating the second gear to the position that directly corresponds to the linear position of the steering rack 76, may thus reduce the amount of steering resistance provided to the steering wheel 12.

How much the first electric motor 24 reduces the amount of steering resistance may be a function of the speed at which the second gear 34 is rotated by the first electric motor. The first ECU 38 may be configured to determine and control the operating speed of the first electric motor 34. Alternatively, the second ECU 42 may be configured to determine the operating speed of the first electric motor 34 and transmit that operating speed to the first ECU 38 for controlling the first electric motor. The determined operating speed of the first electric motor 34 may be a function of the rotational distance that the second gear 34 needs to rotate in order to assume the rotational position that directly corresponds to the linear position of the steering rack 76, the speed at which the second electric motor 52 drives the steering rack 76, the amount of vehicle operator applied steering torque, the type of driving maneuver being performed by the vehicle operator (e.g., parking, turning, and/or slight veering), and/or other vehicle characteristics, such as the vehicle speed.

In case of a failure of the first gear assembly 26, the first electric motor 24 and/or the first ECU 38, the first electric motor may not be functional to rotate the second gear 34 to a rotational position that corresponds to the linear position of the steering rack 76. In this case, the vehicle operator applied steering torque is still determined and sent to the power steering system 46 for controlling the steerable vehicle wheels 48 accordingly. Operation of the power steering system 46, the steering apparatus 10 and/or the vehicle may be adjusted in response to the failure.

From the above description of the invention, those skilled in the art will perceive improvements, changes and modifications. For example, the first electric motor 24 may be controlled by the first ECU 38 to apply a resistance torque to the torsion bar 18 that opposes the vehicle operator applied steering torque.

Although the power steering system is described and shown as having a rack-and-pinion drive, the power steering system may include any other type of drive, such as, for example, a belt drive and/or a drive that utilizes a ball-nut assembly.

Algorithms, determinations, and/or computing processes for controlling the first electric motor 24 may be performed in either the first ECU 38 and/or the second ECU 42. Algorithms, determinations, and/or computing processes for controlling the second steering electric motor 52 may be performed in either the third ECU 50 and/or the second ECU 42.

The steering apparatus 10 may be configured with only the first and third ECUs 38, 50, and without the second ECU 42. The first and third ECUs 38, 50 would thus perform all of their respective algorithms, determinations, computing processes, control functions and directly communicate with one another. In this case, the first ECU 38 may be operatively connected to the torque/position sensor 40, generate the first signal, and transmit the first signal. Similarly, the third ECU 50 may be operatively connected to the position sensor 82. The third ECU 50 may generate a signal indicative of the linear position of the steering rack 76, and transmit that signal to the first ECU 38. The first ECU 38, after receiving the signal from the third ECU 50, may then perform all processes necessary for controlling the first electric motor 34.

The functions of the ECUs 38, 42, 50 can be divided between the ECUs as described above, or can be distributed among the ECUs in a different manner. The three ECUs 38, 42, 50 can be located at any physical location in the vehicle. The three ECUs 38, 42, 50 can be combined into two or one ECU located at any physical location in the vehicle.

Also, although a torsion bar 18 has been provided to permit the steering wheel 12 to rotate relative to the second gear, the steering apparatus 10 may utilize structures other than the torsion bar 18 to permit such relative movement. Such improvements, changes and modifications within the skill of the art are intended to be covered by the appended claims.

Having described the invention, the following is claimed:

1. A steer-by-wire steering apparatus for turning steerable wheels of a vehicle, the steering apparatus comprising:
    a steering wheel rotatable about a steering axis by a vehicle operator to effect turning of the steerable vehicle wheels;
    a first sensor for determining a steering torque applied to the steering wheel by the vehicle operator;
    a power steering system configured to turn the steerable vehicle wheels in accordance with the determined steering torque, the power steering system having a second sensor for sensing a position of a moveable portion of the power steering system, the moveable portion being separate from the steering wheel; and
    a motor operably connected to the steering wheel and controllable to apply a force to the steering wheel, the motor being controlled in accordance with the sensed position of the moveable portion of the power steering system to rotate the steering wheel to a position that directly corresponds to the sensed position of the moveable portion of the power steering system;
    wherein the steer-by-wire steering apparatus includes no mechanical connection between the steering wheel and the steerable vehicle wheels.

2. The steering apparatus recited in claim 1, further comprising engaged first and second gears, the first gear being operably connected to the motor and the second gear being operably connected to the steering wheel, the first gear being rotatable by the motor about a first axis, the second gear being rotatable by the first gear about a second axis.

3. The steering apparatus recited in claim 2, wherein the first gear is a worm wheel and the second gear is a worm screw.

4. The steering apparatus recited in claim 2, wherein first and second gears are rotatable by the motor only, the first and second gears being prevented from being rotated by the steering torque applied to the steering wheel.

5. The steering apparatus recited in claim 2, wherein the first sensor senses a relative rotational position between the steering wheel and the second gear, the determined steering torque being determined as a function of sensed relative rotational position between the steering wheel and the second gear.

6. The steering apparatus recited in claim 2, wherein the moveable portion of the power steering system is a steering rack connected to the steerable vehicle wheels and linearly movable along a rack axis relative to the vehicle, the second sensor sensing a linear position of the steering rack along the rack axis, the motor being controlled in accordance with the sensed linear position of the steering rack.

7. The steering apparatus recited in claim 6, wherein the motor is controlled to rotate the second gear to a rotational position that directly corresponds to the sensed linear position of the steering rack.

8. The steering apparatus recited in claim 2, further comprising a torsion bar interconnecting the steering wheel and the second gear, the torsion bar twisting about a bar axis in response to a predetermined steering torque applied to the steering wheel, the twisting of the torsion bar permitting the steering wheel to rotate about the steering axis relative to the second gear.

9. The steering apparatus recited in claim 8, wherein at least one of the first gear, the second gear and the torsion bar provides a predetermined steering resistance to the steering wheel, the motor controlling the amount of steering resistance provided to the steering wheel by applying a force to the steering wheel through the first and second gears.

10. The steering apparatus recited in claim 8, wherein a first bar end of the torsion bar is connected to the steering wheel and a second bar end of the torsion bar is connected to the second gear, the first bar end twisting about the bar axis relative to the second bar end in response to the predetermined steering torque.

11. The steering apparatus recited in claim 1, wherein the power steering system includes a second motor operably connected to a steering rack and configured to linearly move the steering rack along a rack axis, an output of the second motor being controlled in accordance with the determined steering torque.

12. The steering apparatus recited in claim 1, wherein in a fail state, the motor is prevented from applying the force to the steering wheel, the first sensor senses the steering torque applied by the vehicle operator to the steering wheel, and the power steering system turns the steerable vehicle wheels in accordance with the sensed steering torque.

13. A method for operating the steering apparatus recited in claim 1, the method comprising:
    determining the steering torque applied to the steering wheel by the vehicle operator through the use of the first sensor;
    turning the steerable vehicle wheels with the power steering system in accordance with the determined steering torque;
    sensing the position of the moveable portion of the power steering system with the second sensor; and
    controlling the motor in accordance with the sensed position of the moveable portion of the power steering system to rotate the steering wheel to the position that directly corresponds to the sensed position of the moveable portion of the power steering system.

14. A steering apparatus for turning steerable wheels of a vehicle, the steering apparatus comprising:
    a steering rack;
    a steering wheel rotatable about a steering axis by a vehicle operator to effect turning of the steerable vehicle wheels;
    a rotatable member operably connected to the steering wheel and rotatable about a first axis;
    a first sensor for determining a steering torque applied to the steering wheel by the vehicle operator;
    a second sensor for sensing a linear position of the steering rack;
    a first motor operably connected to the rotatable member and configured to rotate the rotatable member about the first axis, the first motor being controlled to rotate the rotatable member to a rotational position that directly corresponds to the sensed linear position of the steering rack; and
    a second motor operably connected to the steering rack and configured to linearly move the steering rack along a rack axis, the steerable vehicle wheels turning in response to linear movements of the steering rack, an output of the second motor being controlled in accordance with the determined steering torque.

15. The steering apparatus recited in claim 14, further comprising a first gear, the rotatable member being a second gear that is engaged to the first gear, the first gear being operably connected to the first motor and the second gear being operably connected to the steering wheel, the first gear being rotatable by the first motor about a first axis, the second gear being rotatable by the first gear about a second axis.

16. The steering apparatus recited in claim 14, wherein rotatable member is rotatable by the first motor only, the rotatable member being prevented from being rotated by the steering torque applied to the steering wheel.

17. The steering apparatus recited in claim 14, further comprising a torsion bar interconnecting the steering wheel and the rotatable member, the torsion bar twisting about a bar axis in response to a predetermined steering torque applied to the steering wheel, the twisting of the torsion bar permitting the steering wheel to rotate about the steering axis relative to the rotatable member.

18. The steering apparatus recited in claim 14, wherein the steering apparatus is a steer-by-wire steering apparatus.

19. A method for operating the steering apparatus recited in claim 14, the method comprising:

determining the steering torque applied to the steering wheel by the vehicle operator through the use of the first sensor;

controlling an output of the second motor in accordance with the determined steering torque;

sensing the linear position of the steering rack with the second sensor; and controlling the first motor to rotate the rotatable member to the rotational position that directly corresponds to the sensed linear position of the steering rack.

20. The method recited in claim 19, further comprising:

providing a predetermined steering resistance to the steering wheel; and controlling the amount of steering resistance provided to the steering wheel with the first motor.

21. The steering apparatus recited in claim 1, wherein the motor only applies a force to the steering wheel in accordance with the sensed position of the moveable portion of the power steering system.

22. The steering apparatus recited in claim 2, wherein the motor applies a force to rotate the second gear in the same direction as the steering wheel.

23. The steering apparatus recited in claim 1, wherein the power steering system is configured to turn the steerable vehicle wheels in accordance with the determined steering torque regardless of the position of the steering wheel.

* * * * *